(12) United States Patent
Zhang (10) Patent No.: US 9,935,972 B2
(45) Date of Patent: Apr. 3, 2018

(54) EMULATOR-BASED MALWARE LEARNING AND DETECTION

(71) Applicant: Fortinet, Inc., Sunnyvale, CA (US)

(72) Inventor: Jie Zhang, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 236 days.

(21) Appl. No.: 14/754,522

(22) Filed: Jun. 29, 2015

(65) Prior Publication Data

US 2016/0381042 A1    Dec. 29, 2016

(51) Int. Cl.
*H04L 29/06*  (2006.01)
*G06N 99/00*  (2010.01)

(52) U.S. Cl.
CPC ......... *H04L 63/145* (2013.01); *G06N 99/005* (2013.01); *H04L 63/1416* (2013.01)

(58) Field of Classification Search
None
See application file for complete search history.

(56) References Cited

U.S. PATENT DOCUMENTS

| | | | | | |
|---|---|---|---|---|---|
| 2004/0255165 A1* | 12/2004 | Szor | ...... | G06F 21/566 | 726/24 |
| 2006/0230452 A1* | 10/2006 | Field | ...... | G06F 21/562 | 726/22 |
| 2007/0016953 A1* | 1/2007 | Morris | ...... | G06F 21/56 | 726/24 |
| 2007/0180528 A1* | 8/2007 | Kane | ...... | G06F 21/56 | 726/24 |
| 2009/0320133 A1* | 12/2009 | Viljoen | ...... | G06F 21/564 | 726/24 |

* cited by examiner

*Primary Examiner* — William J. Goodchild
(74) *Attorney, Agent, or Firm* — Hamilton, DeSanctis & Cha LLP (57) ABSTRACT

Methods and systems are described for malware learning and detection. According to one embodiment, an antivirus (AV) engine includes a training mode for internal lab use, for example, and a detection mode for use in commercial deployments. In training mode, an original set of suspicious patterns is generated by scanning malware samples. A set of clean patterns is generated by scanning clean samples. A revised set of suspicious patterns is created by removing the clean patterns from the original set. A further revised set of suspicious patterns is created by: (i) applying a statistical filter to the first revised set; and (ii) removing any suspicious patterns therefrom that do not meet a predefined frequency of occurrence. A detection model, based on the further revised set, can then be used in detection mode to flag executables as malware when the presence of one or more of the suspicious patterns is identified.

10 Claims, 7 Drawing Sheets

EMULATOR-BASED MALWARE LEARNING AND DETECTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2015, Fortinet, Inc.

BACKGROUND

Field

Embodiments of the present invention generally relate to network security. In particular, embodiments of the present invention relate to automated malware learning and detection.

Description of the Related Art

Cyber security experts and hackers are in continuous battle that is not going to end anytime soon. Cyber attackers are becoming smarter and use advanced software and hardware technologies to initiate different types of attacks on computers/networks. A hacker/cyber attacker typically uses various types of malicious software such as viruses, worms, and Trojan horses for conducting illegitimate operations in computer systems and/or to get illegitimate access of network and/or network resources. Such malicious software/content may be used, for example, for causing damage to data or equipment, or for extracting or modifying data.

There are several security checks implemented within computer networks to detect and filter out malicious traffic/content/files. Detection of malware/cyber intrusion attempts is the first step towards securing computers/networks, and for implementing security checks at different levels such as at firewalls, gateways, and end user devices. Existing detection systems typically rely on signatures of known malware/malicious content/file/traffic to detect and filter them out. Therefore, most of the present day commercial anti-virus (AV) and intrusion detection systems (IDS) rely largely on signature-based methods to identify malicious code before the code causes harm to computer systems and/or travels through the network.

In typical signature-based systems, signatures of malicious code/traffic/file/content are stored in a signature database, which is updated at regular intervals with signatures of newly detected malicious code/traffic/file/content. Therefore, for an IDS to be able to detect a threat/malware, the signature, which is essentially a fingerprint for malware, should already be known and deployed within the IDS, usually through an AV update and/or a patch. Because signature-based systems are dependent on signatures relating to known threats, this paradigm has several drawbacks. For example, such systems can only detect threats that have already been observed and/or use variations on known threats that match existing signatures. Traditional signature based malware detection/intrusion detection systems are, as a result, prone to zero-day attacks, and are not able to detect/classify new malware and/or malicious code/traffic/file/content for which a signature has not yet been created.

With intruders becoming smarter, they are able to determine the type of traffic that is being detected and/or blocked by existing malware detection systems, and hence are able to change their patterns of attack so as to avoid signature-based detection. For example, an attacker may create and introduce a new type of malware/attack that leverage existing code bases but that is packaged in a different way thereby avoiding detection by signature-based detection systems at least until a new signature is developed and deployed for the new attack.

Furthermore, with numerous suspicious samples being submitted to existing AV engines every day, processing of such samples and creation of appropriate signatures is a big challenge. Current signature generation approaches are resulting in larger and larger AV pattern databases and create generic signatures that result in false positives, which require time to process and fix.

There is therefore a need in the art for an automated malware learning and detection system that can use a learning-based approach for effectively generating/updating a generic signature for malware detection, providing better detection for zero-day attacks, and controlling false positives in effective manner.

SUMMARY

Methods and systems are described for automatic malware learning and detection. According to one embodiment, when in a training mode, an original set of suspicious patterns that are capable of being used to detect a malware executable are generated by an antivirus (AV) engine by scanning a first set of samples of executables known to be or contain malware. A set of clean patterns is generated by then scanning a second set of samples of executables known not to be or contain malware. A first revised set of suspicious patterns is created having a first false positive rate lower than that of the original set of suspicious patterns by removing any of the set of clean patterns from the set of suspicious patterns. A second revised set of suspicious patterns having a second false positive rate lower than the first false positive rate is created and optimized by: (i) applying a statistical filter to the first revised set of suspicious patterns; and (ii) removing any suspicious patterns from the first revised set of suspicious patterns that do not meet a predefined frequency of occurrence. When in a detection mode, an executable is received by the AV engine. A set of target patterns represented within the executable are extracted. A detection model, based on the second revised set of suspicious patterns, is applied against the set of target patterns. The executable is flagged as malware when the detection model indicates one or more target patterns within the set of target patterns matches any suspicious patterns in the second revised set of suspicious patterns.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Methods and systems are described for automatic malware learning and detection. In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of conducting network auditing, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named element.

Methods and systems are described for automatic malware learning and detection. Embodiments of the present invention relate to creation of a set of suspicious patterns that are capable of detecting a malware executable, and matching the set of suspicious patterns against a set of target patterns represented within a target executable to determine whether the target executable is malware.

In an aspect, a method for determining whether an incoming executable is malware is provided, wherein the method can include a training mode having the steps of generating, by an antivirus (AV) engine, an original set of suspicious patterns that are capable of being used to detect a malware executable by scanning a first set of samples of executables known to be or contain malware. The training mode, as part of the method, can further include generating a set of clean patterns by scanning a second set of samples of executables known not to be or contain malware. The training mode can further include the step of creating a first revised set of suspicious patterns having a first false positive rate lower than that of the original set of suspicious patterns by removing any of the set of clean patterns from the set of suspicious patterns. The training mode can further include the step of creating and optimizing a second revised set of suspicious patterns having a second false positive rate lower than the first false positive rate by applying a statistical filter to the first revised set of suspicious patterns, and by removing any suspicious patterns from the first revised set of suspicious patterns that do not meet a predefined frequency of occurrence. Examples of suspicious patterns are described further below.

In an aspect, the method can further include a detection mode having the steps of receiving, by the AV engine, an executable, and extracting a set of target patterns represented within the executable. The detection mode can further include the steps of applying a detection model, based on the second revised set of suspicious patterns, against the set of target patterns; and flagging the executable as malware when the detection model indicates one or more target patterns within the set of target patterns matches any suspicious patterns in the second revised set of suspicious patterns.

In another aspect, if the step of flagging the executable as malware is determined to be a false positive, the detection mode can further be configured to add the executable to the set of clean patterns and initiating retraining of the AV engine. In another aspect, generating an original set of suspicious patterns can include causing the original set of suspicious patterns to be run within an emulator. In yet another aspect, the step of extracting a set of target patterns represented within the executable can include causing the executable to be run within the emulator.

In an aspect, a system for determining whether an incoming executable is malware is provided. The system includes a training sample receive module that is configured to receive multiple samples from a sample database, and a clean sample database configuration module configured to scan the samples to generate a first database comprising clean samples from the samples, wherein the clean samples are free of malware. The system can further include a malware sample database configuration module that is configured to scan the samples to generate a second database comprising malware samples from the samples. The system can finally include a detection knowledge database configuration module configured to learn from the first database and the second database to generate a detection knowledge database that is indicative of a signature that is configured to process an incoming sample and detect if the incoming sample is a malware.

In an aspect, if an incoming sample is processed with the signature for malware detection and identified as a false positive, the incoming sample can be re-trained to be stored in the first database. In another aspect, if an incoming sample is processed with the signature for malware detection and identified as a malware, the incoming sample is stored in the second database, and wherein a detection pattern is generated from the incoming sample. Furthermore, the signature can be updated based on such detection pattern. In an aspect, the signature is indicative of high frequency suspicious detection patterns, and can be matched with one or more of the incoming samples based on a threshold such that if similarity index of at least one of the incoming samples matches with the threshold, the system can be configured to report the at least one of the incoming samples as a malware. In another aspect, the system can be configured in/as an emulator.

Figure 1:
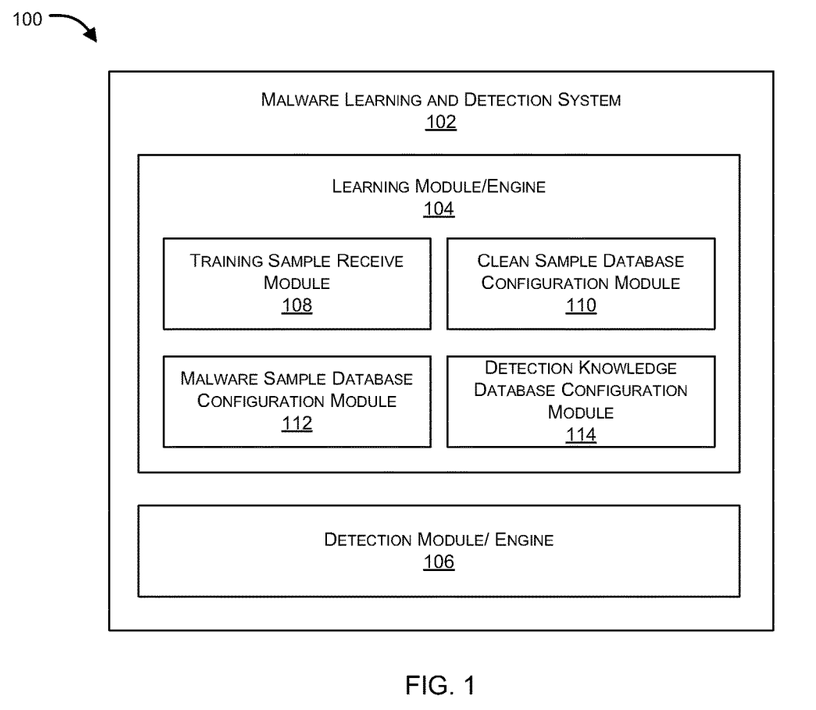
FIG. 1 illustrates exemplary functional modules of the proposed malware detection system in accordance with an embodiment of the present disclosure.

FIG. 1 illustrates exemplary functional modules 100 of a malware learning and detection system 102 in accordance with an embodiment of the present disclosure. As shown in FIG. 1, malware learning and detection system 102, which may also be referred as Anti-Virus engine or AV engine, can include a leaning module/engine 104, which may be interchangeably referred to as learning module 104 or learning engine 104 or training engine/module 104 hereinafter, that is configured to provide adaptive learning/training to the system 102 to generate a set of suspicious patterns having a low false positive rate and a set of clean patterns, and a detection module/engine 106, which may be interchangeably referred to as detection module 106 or detection engine 106 hereinafter, that can be configured to detect whether a target/incoming executable/sample is malware based on the learning/training engine 104.

According to one embodiment, learning module 104 can include a training sample receive module 108 that can be configured to receive multiple training samples containing clean samples and malware samples, a clean sample database configuration module 110 that can be configured to scan the training samples to generate a first database that stores clean samples, a malware sample database configuration module 112 that can be configured to scan the training samples to generate a second database that stores malware samples, and a detection knowledge database configuration module 114 that can be configured to learn from the first database and the second database to generate a detection knowledge database containing signatures that can be used to process an incoming sample and detect if the incoming sample is malware.

According to one embodiment, training sample receive module 108 can be configured to receive training samples, which can include both pre-classified clean samples, which may also be referred as clean executables, and pre-classified malicious samples, which may also be referred to as malicious executables. Those skilled in the art will appreciate that the word sample has been used here to refer to a file, an executable or portions thereof. Training sample receive module 108 can receive the training samples/executables along with its suggestive patterns from one or more sample collection servers, or from a central server, for instance. In an example implementation, training sample receive module 108 can be configured to receive the training samples/executables from multiple configured sources. In an example implementation, training sample receive module 108 can receive training samples/executables from Anti-Virus labs (AVLAB) or one or more third party vendors supplying such training samples. Those skilled in the art will appreciate that the training samples could have previously been classified as clean samples and/or malicious samples by the system 102, or any other malware detection system. In an example implementation, training sample receive module 108 can be configured to be synchronized with a central repository of clean samples and central repository of malicious samples to obtain the training samples.

According to another embodiment, clean sample database configuration module 110 can be configured to scan the training samples to generate a first database comprising clean samples, which may also be referred to as clean sample database. In an exemplary implementation, clean sample database configuration module 110 can store pre-classified clean samples received as part of the training samples directly in the clean sample database. In another exemplary implementation, clean sample database configuration module 110 can apply one or more rules to verify that the training sample is clean or malware free before storing the training sample in the clean sample database. In an implementation, clean sample database can be directly synchronized with one or more sources that provide training samples containing clean samples. In another implementation, clean sample database configuration module 110 can also be configured to enable the AV engine to generate and store a set of clean patterns by scanning a set of samples of executables that are known not to be or contain malware.

According to one embodiment, malware sample database configuration module 112 can be configured to scan the training samples and generate a second database that stores malware samples, which may be referred to as malware sample database. Malware sample database configuration module 112 can directly store one or more pre-classified malicious samples received as part of the training samples in the malware sample database. In an exemplary implementation, malware sample database configuration module 112 can also apply one or more rules to verify that a training sample contains malware/malicious content before storing the training sample in malware sample database. In an implementation, malware sample database can be synchronized with one or more sources that provide training samples containing malware executables. In another implementation, malware sample database configuration module 112 can also be configured to enable the AV engine to generate an original set of suspicious patterns that are capable of being used to detect a malware executable by scanning a first set of samples of executables known to be or contain malware. In an implementation, different known pattern identification algorithms can be used for identifying the patterns of known malware executables, all of which are completely within the scope of the present disclosure.

According to one embodiment, the malware database/second database can be updated/refined by analyzing samples that may have been wrongly classified as malware samples in order to reduce the false positive rate during subsequent malware detection processing. For instance, samples/executables that form part of the second database can be re-evaluated and clean samples that have been wrongly classified as malware (a false positive) can be eliminated from the malware database, and such clean samples can be stored in the first/clean database. In another aspect, a first revised set of suspicious patterns can be created (from the original set of suspicious patterns) by the AV engine by removing any of set of clean patterns from the set of suspicious patterns, wherein the first revised set of suspicious patterns when used to perform malware scanning have a false positive rate lower than that of the original set of suspicious patterns.

In an exemplary implementation, each malware sample that forms part of malware sample database can be manually and/or automatically reviewed to evaluate whether the sample represents a false positive situation. In another exemplary implementation, only high frequency malware samples are manually and/or automatically reviewed.

In another embodiment, from the first revised set of suspicious patterns, AV engine can further be configured to generate a second revised set of suspicious patterns having a second false positive rate lower than the first false positive rate. Such second revised set of suspicious patterns can therefore further eliminate samples/executables/patterns that are not malware indicating patterns by applying, for instance, a statistical filter to the first revised set of suspicious patterns, and then removing, by the AV engine, any suspicious patterns from the first revised set of suspicious patterns that meet or exceed a predefined frequency of occurrence. Therefore, the second revised set of suspicious patterns can further eliminate one or more patterns that formed part of the first revised set of suspicious patterns and exceeded a defined frequency of occurrence to qualify them as a non-malware pattern.

In another exemplary implementation, in order to reduce false positives, the system 102 can further be trained with one or more clean samples, and a healthy database of clean samples can be maintained. Furthermore, in order to control false positives, high frequency samples can be statistically reviewed to conclude whether they are clean samples.

In another embodiment, detection knowledge database configuration module 114 can be configured to learn from the first/clean database and the second/malware database to generate a detection knowledge database that is indicative of a signature that is configured to process an incoming sample and detect if the incoming sample is a malware. For instance, as the clean sample database and the malware sample database gets populated/updated, detection knowledge database configuration module 114 can create/update the signature based on patterns that are classified under second revised set of suspicious patterns or under the set of clean patterns. The signature(s) can then be used for detection of malware in the target/incoming samples/executables.

In an exemplary implementation, detection knowledge database configuration module 114 can be configured to create a signature of clean samples and/or malware samples using one or more known signature generation algorithms and/or hash generation algorithms. Once signatures for clean samples and malware samples are generated, the same can be used for filtering/blocking the malicious pattern indicating executables/samples, and allowing the executables matching with clean patterns to pass.

According to one embodiment, detection module/engine 106 can use signatures generated by the detection knowledge configuration module 114 of learning module 104 to classify incoming/target samples into clean samples or malware samples so as to allow/block the transmission/processing of such samples. In an aspect, if an incoming sample is processed with a malware indicating signature and is identified as a false positive, the incoming sample can be re-trained to be stored in the first/clean database. On the other hand, if an incoming sample is processed with a malware indicating signature and identified as a malware, the incoming sample can be stored in the second/malware database, and wherein a detection pattern can be generated from the incoming sample. Furthermore, the signature can be updated based on such detection pattern. In an aspect, the signature is indicative of high frequency suspicious detection patterns, and can be matched with one or more of the incoming samples based on a threshold such that if a similarity index of at least one of the incoming samples matches within the threshold, the system can be configured to report the matched incoming sample(s) as a malware.

According to one embodiment, detection module/engine 106 can be configured to run the AV engine/system in a detection mode, wherein the AV engine can receive an executable/sample, extract a set of target patterns represented within the executable, and then apply a detection model, based on the second revised set of suspicious patterns, against the set of target patterns. Based on such application of the detection model, the AV engine can flag the executable as malware when the detection model indicates that a target pattern within the set of target patterns matches any suspicious patterns in the second revised set of suspicious patterns.

In an embodiment, for efficiency, multiple clean samples can be represented by a global clean signature. Similarly, multiple malicious samples can be represented by a global malicious signature, wherein the global clean signature can be created by combining similar patterns of clean samples and global malicious signature can be created by combining similar patterns of malicious samples. Such an architecture can help reduce the burden of detection module 106 by reducing the number of signatures to be processed. For example, if there were thousands of clean patterns, which can be represented by say 300 unique global signatures, the detection module 106 would just need to match the patterns of the incoming/target samples with defined 300 unique global signatures.

In an example implementation, detection module 106 can receive one or more target files/samples, also referred as executables, wherein the target files/executables can be files being communicated over a network or a file stored within a file system of a computer system. Detection module 106 can process the received files or executables and extract a set of target patterns within the executables. In an example implementation, after extracting the target patterns, the detection module 106 can use/apply malware sample database and/or clean sample database to match the target patterns with one of those existing in the malware sample database or in the clean sample database. By matching the target pattern with the samples/patterns stored in clean sample database and in the malware sample database, detection module 106 can flag/determine whether the file at issue contains malware or is clean.

In another example implementation, detection module 106 can be configured to generate a signature of the target/incoming sample/patterns, which can be matched with the signatures created by the training module 104, specifically by detection knowledge database configuration module 114. In an example implementation, detection module 16 can be configured to match a signature from the target sample/pattern with the global clean signatures and/or global malware signature, based on which, detection module 106 can flag/determine whether the file at issue contains malware or is clean.

In an aspect, detection module 106 can consider the refined set of suspicious patterns to match with the target patterns of the incoming executable, wherein the refined set of suspicious patterns, as explained above, can be generated based on consideration of multiple levels of false positive rates in the malware database and evicting the patterns that have higher false positive rates considering a threshold. In an example implementation, if detection module 106 flags/detects a target sample/pattern as malware, but later, upon inspection, it is found that the detection was a false positive, the sample (pattern(s) thereof) can be reported to learning module 104, which can then move the corresponding sample (along with patterns thereof) from the malware sample database to the clean sample database. In an exemplary implementation, a sample is moved from the malware sample database to the clean sample database only if the false positive rate for the sample is more than a predefined threshold.

Those skilled in the art will appreciate that although embodiments of malware learning and detection system 102 have been explained with reference to two modes of operation, i.e. a training/learning mode and a detection mode, more or fewer modes can be implemented.

In an exemplary implementation, the learning mode and/or the detection mode can be enabled for internal use by an antivirus software vendor, a vendor of network security devices or the like. In another possible implementation, learning module 104 can be enabled for internal use by such a vendor by a server system and detection module 106 can be enabled for one or more client devices. In another example implementation, learning module 104 and detection module 106 can be enabled within different computing devices for better performance of malware learning and detection system 102. When learning module 104 is implemented within a first computing device, and detection module 106 is implemented within a second computing device, signatures that are part of the clean samples and signatures that are port of the malware samples can be shared among the first and second computing devices.

In another implementation, malware learning and detection system 102 can be implemented within or otherwise interact with an emulator. In an example implementation, one or more selected modules can be implemented within or can otherwise make use of an emulator. For example, detection module 106 can be run with an emulator or malware database configuration module 112 and clean sample database configuration module 112 can run with the help of an emulator.

Malware learning and detection system 102 can be a supervised and adaptive learning based system for detection of malware. In an example implementation, as training sample receive module 108 receives the training samples containing both pre-classified clean samples and pre-classified malicious samples, separate databases such as clean sample database and malicious sample database, can be created and managed by clean sample data configuration module 110 and malware sample database configuration module 112 respectively. Further, using detection knowledge database configuration module 114, a base knowledge database can be created. As explained above, in an example implementation, learning module 104 can optimize the databases by excluding over inclusive signatures that result in false positives from the malware sample database.

Figure 2:
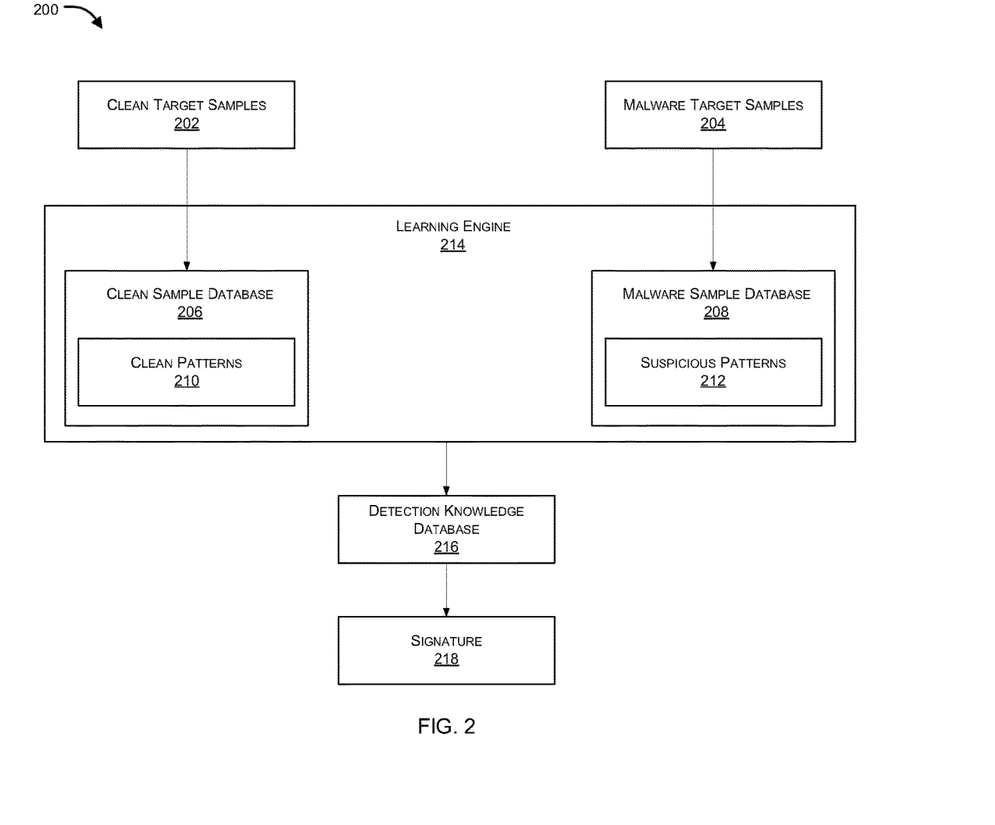
FIG. 2 illustrates an exemplary block diagram showing generation of detection knowledge database/detection model in accordance with an embodiment of the present disclosure.

FIG. 2 illustrates an exemplary block diagram 200 showing generation of a detection knowledge database/detection model 216 in accordance with an embodiment of the present disclosure. As shown in FIG. 2, learning engine 214 can be used for generation of knowledge database/detection model 216 for detection of malware being transmitted through or otherwise residing in a computer network or computer system. In an exemplary implementation, learning engine 214 can be trained with known clean target samples 202 and malware target samples 204, wherein the clean target samples 202 and/or the malware target samples 204 can be obtained from historical databases or third party services, which maintain a collection/database of clean samples and malicious samples.

In an implementation, clean target samples 202 can be received by learning engine 214, processed and the resulting signatures and/or patterns can be stored in a clean sample database 206. Similarly, malware target samples 204 can be received by learning engine 214, processed and the resulting signature and/or patterns can be stored in a malware sample database 208. In one implementation, learning engine 214 can be incorporated in an Anti-Virus (AV) engine and can be configured to generate an original set of suspicious patterns 212 that are capable of being used to detect malware executables by scanning a first set of samples (malware target samples 204) of executables known to be or contain malware. Such original set of suspicious patterns 212 can be generated from malicious target samples 204 that are known to contain malware. Similarly, learning engine 214 can also be configured to generate a set of clean patterns 210 by scanning a second set of samples (clean target samples 202) of executables known not to be or contain malware.

According to one embodiment, the original set of suspicious patterns 212 can be refined by creating a first revised set of suspicious patterns having a first false positive rate that is lower than that of the original set of suspicious patterns 212 by removing patterns appearing in the set of clean patterns from the set of suspicious patterns. In an aspect therefore, all the original set of suspicious patterns 212 can be evaluated based on a given first false positive rate and only suspicious patterns that have rate lower than the false positive rate and be kept in the malware sample database 208 and the other patterns can be assumed to be clean patterns and hence transferred to the clean sample database 206.

In an aspect, from the first revised set of suspicious patterns, a second revised set of suspicious patterns may also be generated and optimized such that the second revised set of suspicious patterns have a second false positive rate that is lower than the first false positive rate by applying a statistical filter to the first revised set of suspicious patterns, and by removing any suspicious patterns from the first revised set of suspicious patterns that do not meet a predefined frequency of occurrence.

In an aspect, based on clean patterns 210 that are stored in the clean sample database 206 and suspicious samples 212 that are stored in the malware sample database 208, a detection knowledge database 216 can be generated, which can be referred to by a detection engine to classify and evaluate whether an incoming target file/executable is malware or a clean file. In an aspect, detection knowledge database 216 can learn from clean sample database 206 and from malware sample database 208 to continuously update itself, wherein clean sample database 206 can be configured as being indicative of a signature 218 that is configured to process an incoming sample and detect if the incoming sample is a malware. In an exemplary implementation therefore, signature 218 can be created from the detection knowledge database 216, wherein the signature 218 can further be used by the detection engine to quickly classify a file as a malicious file or a clean file.

In an example implementation, for multiple patterns, such as clean patterns 210, a global clean signature can be created. Similarly, for multiple malware/suspicious patterns, a global malware signature can be generated, wherein learning engine 214 can create a database of global clean signatures, also referred as generalized clean signatures and a database of global malware signatures, also referred as generalized malware signatures. Such generalized clean/malware signatures can be used by the malware detection engine for fast classification/detection of malwares/malicious content.

In an example implementation, learning engine 214 can be run within an emulator in order to receive the patterns of clean samples and malware samples, and generate multiple generic clean signatures/patterns and multiple generic malware signatures/patterns. In an example implementation, in order to reduce/strip down the number of malware/suspicious patterns and signatures, suitable statistical filters can be incorporated.

Figure 3:
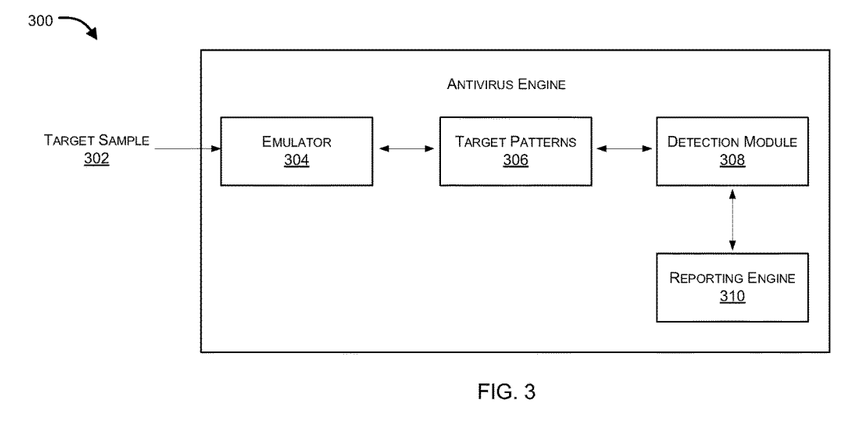
FIG. 3 illustrates an exemplary block diagram showing malware detection using proposed detection model in accordance with an embodiment of the present disclosure.

FIG. 3 illustrates an exemplary block diagram 300 showing malware detection using a detection model 308 in accordance with an embodiment of the present disclosure. In an aspect, an AV engine can be configured to receive a target file/sample 302, which may also be referred to as executable 302 hereinafter, wherein target file/executable 302 can be a file that is communicated over a network, or can be a file stored in a computer system.

According to one implementation, detection module 308 can implemented in conjunction with an emulator 304 that can process received target file/sample or executable 302 and extract a set of target patterns 306 within the executable 302. In an example implementation, after extracting target patterns 306, detection module 308 of the AV engine can use/apply malware sample database and/or clean sample database to match the target patterns 306 of the incoming executable 302 with one of those existing in the malware sample database or in the clean sample database. By matching the target patterns 306 with the samples/patterns stored in clean sample database and in the malware sample database, detection module 308 can flag/determine if target sample 302 is or contains malware.

In another example implementation, detection module 308 can be configured to generate a signature of the target/incoming sample/patterns, which can be matched with the signatures created by the training module of the present system. In an example implementation, detection module 308 can be configured to match the signature of target sample 306 with the global clean signatures and/or global malware signature, based on which, the detection module 308 can flag/determine if the received file contains malware or the received file is clean.

In an aspect, detection module 308 can consider the refined set of suspicious patterns created during the training phase, to match with the target patterns 306 of the incoming executable 302 to determine if the executable is malware, wherein the refined set of suspicious patterns, as explained above, can be generated based on consideration of multiple levels of false positive rates in the malware database and evicting the patterns that have higher false positive rates considering a threshold. When malware is detected upon the matching, reporting engine 310 of the AV engine can be used to report the same to the administrator/user.

Figure 4:
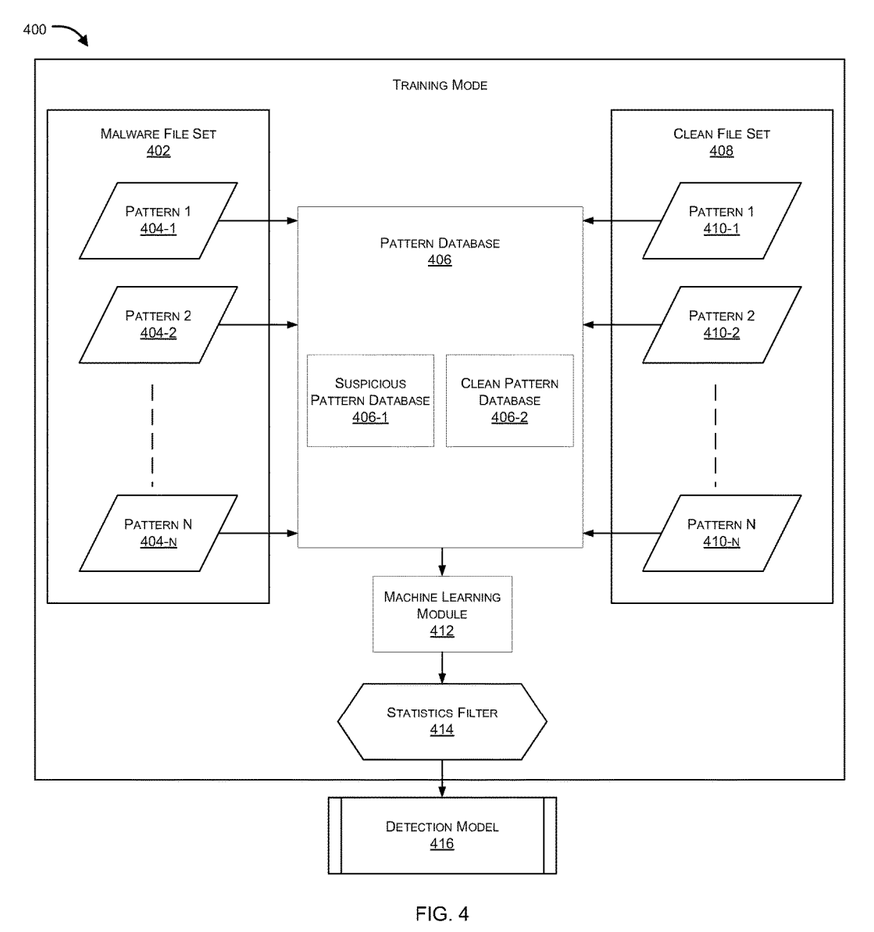
FIG. 4 illustrates an exemplary block diagram showing generation of detection knowledge database/detection model in accordance with an embodiment of the present disclosure.

FIG. 4 illustrates an exemplary block diagram 400 showing generation of detection knowledge database/detection model 416 in accordance with an embodiment of the present disclosure. As shown, during the training mode, multiple malware/suspicious patterns such as 404-1, 404-2, . . . 404-N, which may be collectively referred to as suspicious patterns 404 hereinafter, can be generated/created by an AV engine based on a malware file set 402 that contains therein a first set of samples of executables that are known to be or contain malware. Similarly, multiple clean patterns such as 410-1, 410-2, . . . 410-M, which may be collectively referred to as clean patterns 410 hereinafter, can be generated/created by the AV engine based on a clean file set 408 that contains therein a second set of samples of executables that are known not to be or contain malware. The generated patterns can then either be stored in a single database/repository such as 406 (406-1 storing suspicious patterns 404, and 406-2 storing clean patterns 410, for instance) or in multiple databases that are designated to indicate whether they are storing clean patterns 410 or suspicious patterns 404.

In an aspect, machine learning module 412 can be configured process suspicious patterns 406 to generate, from suspicious patterns 404, a first revised set of suspicious patterns that have a first false positive rate lower than that of the original set of suspicious patterns 404 by removing, by the AV engine, any of the set of clean patterns from the set of suspicious patterns.

Additionally, suspicious patterns 404 that have a false positive rate greater than a defined first false positive rate may be moved to the clean pattern database 406-2. For example, AV engine can further be configured to create and optimize a second revised set of suspicious patterns having a second false positive rate that is lower than the first false positive rate by applying a statistical filter 414 to the first revised set of suspicious patterns and by removing any suspicious patterns from the first revised set of suspicious patterns that do not meet a predefined frequency of occurrence to move them to the clean pattern database. Once the final set of suspicious patterns have been generated, the AV engine can learn from the clean pattern database 406-2 and from the suspicious pattern database 406-1 (that stores the final set of suspicious patterns) to generate detection model 416 that is indicative of a signature that is configured to process incoming samples and detect whether the incoming samples are malware.

Figure 5:
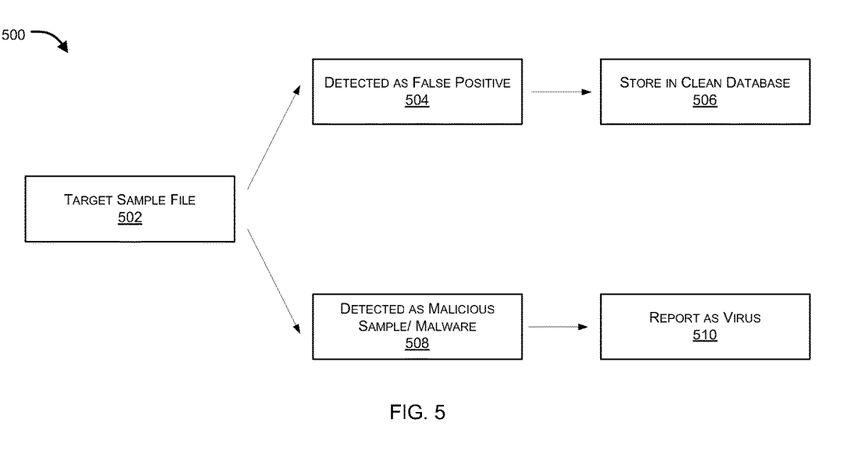
FIG. 5 illustrates an exemplary block diagram showing classification of a target sample file as a clean file or a malware/virus file in accordance with an embodiment of the present disclosure.

FIG. 5 illustrates an exemplary block diagram 500 showing classification of a target sample file as a clean file or a malware/virus file in accordance with an embodiment of the present disclosure. In an aspect, once the AV engine has been trained with a known set of clean and suspicious patterns to generate a detection model, it can receive an executable/target sample file 502 and then configure the detection model to extracting a set of target patterns represented within the executable. The set of target patterns can then be matched with the final set of suspicious patterns in order to flag the executable as malware when the detection model indicates that one or more target patterns within the set of target patterns matches any suspicious patterns in the final set of suspicious patterns. In case the declared malware is found to be a false positive 504, the target sample (patterns thereof) can be stored in a clean pattern database 506, else if the declared malware is found to be a correct malware/malicious sample 508, the target sample (patterns thereof) can be stored in a suspicious pattern database 510 and reported as virus.

Figure 6:
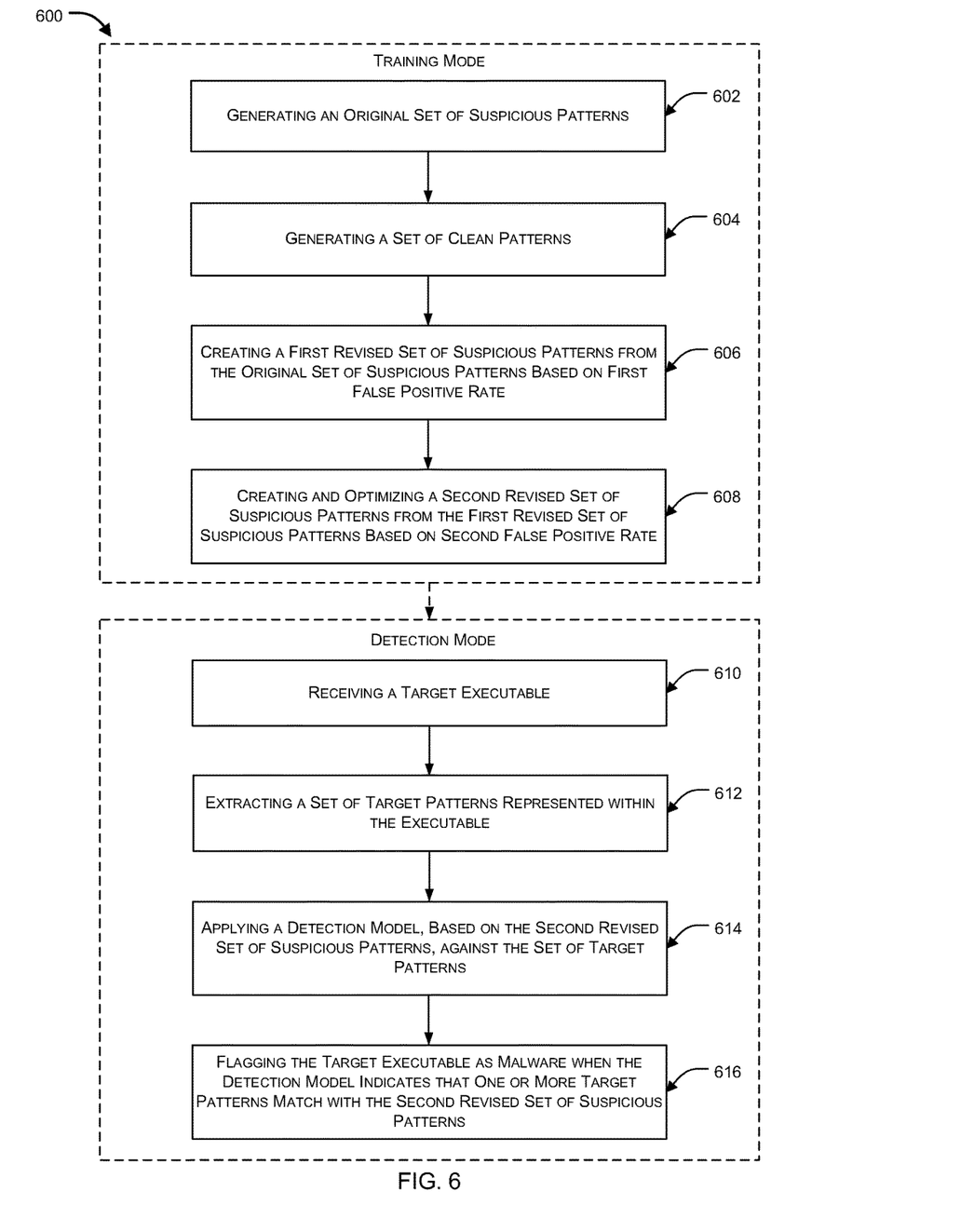
FIG. 6 illustrates an exemplary flow diagram showing generation of detection knowledge database/detection model in accordance with an embodiment of the present disclosure.

FIG. 6 illustrates an exemplary flow diagram 600 showing generation of a detection knowledge database/detection model in accordance with an embodiment of the present disclosure. At step 602, as part of the training mode, the method can include generating, by an antivirus (AV) engine, an original set of suspicious patterns that are capable of being used to detect a malware executable by scanning a first set of samples of executables known to be or contain malware. At step 604, as part of the training mode, the method can include generating, by the AV engine, a set of clean patterns by scanning a second set of samples of executables known not to be or contain malware. At step 606, at part of the training model, the method can include creating a first revised set of suspicious patterns having a first false positive rate lower than that of the original set of suspicious patterns by removing, by the AV engine, any of the set of clean patterns from the set of suspicious patterns. At step 608, as part of the training mode, the method can include creating and optimizing a second revised set of suspicious patterns having a second false positive rate lower than the first false positive rate by applying a statistical filter to the first revised set of suspicious patterns and by removing any suspicious patterns from the first revised set of suspicious patterns that do not meet a predefined frequency of occurrence At step 610, as part of the detection mode, the method can include receiving, by the AV engine, an executable, and at step 612, extracting a set of target patterns represented within the executable. At step 614, as part of the detection mode, the method can include applying a detection model, based on the second revised set of suspicious patterns, against the set of target patterns, and at step 616, flagging the executable as malware when the detection model indicates one or more target patterns within the set of target patterns matches any suspicious patterns in the second revised set of suspicious patterns.

Figure 7:
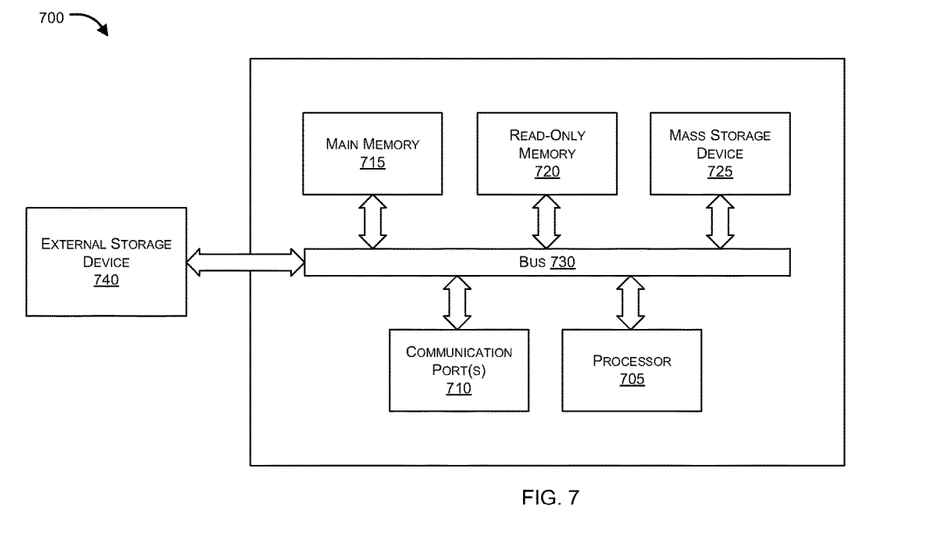
FIG. 7 is an exemplary computer system in which or with which embodiments of the present invention may be utilized.

FIG. 7 is an example of a computer system 700 with which embodiments of the present disclosure may be utilized. Computer system 700 may represent or form a part of a network security device, network appliance, an antivirus engine, a server, a client workstation or other appropriate network device that may be used to learn and/or detect malware.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with embodiments of the present invention.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Examples of Suspicious Patterns

There are many useful suspicious patterns that may be used in connection with emulation. While impossible to describe and/or illustrate every possible type of suspicious pattern, non-limiting examples are provided below, including normalized instruction sequence, suspicious behaviors and junk code.

Example #1: Normalized Instruction Sequence

For purposes of this example, two different versions of the PushDo malware family have been selected to demonstrate.

| FILE1: | |
|---|---|
| MD5 | 4EE6405365CE6AF774E10109813B170A |
| SIZE | 41,984 bytes |
| DISCOVER YEAR | 2012 |

| FILE2: | |
|---|---|
| MD5 | 0D4DA5C2BECB45DBB5AF95545B9E7108 |
| SIZE | 46,592 bytes |
| DISCOVER YEAR | 2014 |

Although these two samples are not identical, there are many similar instruction sequences, as illustrated below in Table 1 and Table 2.

TABLE 1

Instruction Sequence in File1

```
.text:04001082 8D 4D 08         lea    ecx, [ebp+phkResult]
.text:04001085 51               push   ecx              ; phkResult
.text:04001086 6B 3F 00 0F 00   push   0F003Fh          ; samDesired
.text:0400108B 53               push   ebx              ; ulOptions
.text:0400108C 68 88 51 00 04   push   offset SubKey    ; "software..."
.text:04001091 50               push   eax              ; hKey
.text:04001092 89 5D 08         mov    [ebp+phkResult], ebx
.text:04001095 FF 15 08 50 00   call   ds:RegOpenKeyExA
04
.text:0400109B 85 C0            test   eax, eax
.text:0400109D 75 25            jnz    short loc_40010C4
```

TABLE 2

Instruction Sequence in File2

```
.text:04001138 8D 4D 08         lea    ecx, [ebp+phkResult]
.text:0400113B 51               push   ecx              ; phkResult
.text:0400113C 68 3F 00 0F 00   push   0F003Fh          ; samDesired
.text:04001141 53               push   ebx              ; ulOptions
.text:04001142 68 F8 61 00 04   push   offset SubKey    ; "software..."
.text:04001147 50               push   eax              ; hKey
.text:04001148 89 5D 08         mov    [ebp+phkResult], ebx
.text:0400114B FF 15 1C 60 00   call   ds:RegOpenKeyExA
04
.text:04001151 85 C0            test   eax, eax
.text:04001153 75 25            jnz    short loc_400117A
```

The binary codes of the instruction sequences are as follows (with File1 on top and File2 on the bottom):

```
8D 4D 08 51 68 3F 00 0F 00 53 68 88 51 00 04 50 89 5D 08 FF 15
08 50 00 04 85 C0 75 25
8D 4D 08 51 68 3F 00 0F 00 53 68 F8 61 00 04 50 89 5D 08 FF 15
1C 60 00 04 85 C0 75 25
```

To make the binary codes consistent, mutable information can be stripped to normalize the two files. After normalizing, the following sequence can be observed:

```
8D 4D 08 51 68 3F 00 0F 00 53 68 00 00 00 00 50 89 5D 08 FF 15
00 00 00 00 85 C0 75 25
8D 4D 08 51 68 3F 00 0F 00 53 68 00 00 00 00 50 89 5D 08 FF 15
00 00 00 00 85 C0 75 25
```

As such, the normalized binary sequence or its hash code can then be used to as a suspicious sample to compare with other samples' normalized binary sequence to identify potential variants.

Example #2: Suspicious Behaviors

Empirical evidence indicates malicious samples commonly exhibit suspicious behaviors, few of which appear in clean files. Examples of suspicious behaviors include, but are not limited to, remote process injection, dynamic modification of TLS callback and anti-debugging techniques. In embodiments of the present invention, these behaviors, among others, can be used as suspicious patterns to identify potential malware.

Example #3: Junk Code

Modern malware often attempts to evade emulator detection and/or researcher analysis. They often insert junk code and/or junk API calls, for example, into their samples for purposes of obfuscation. Such junk code and junk API calls are rarely found in normal files. Therefore, they are also useful in forming suspicious patterns.

TABLE 3

Junk code and API calls

| | | |
|---|---|---|
| code1:00401027 B8 CC 40 40 00 | mov | eax, offset GetOEMCP |
| code1:0040102C FF 10 | call | dword ptr [eax] |
| code1:0040102E B8 CC 40 40 00 | mov | eax, offset GetOEMCP |
| code1:00401033 FF 10 | call | dword ptr [eax] |

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
when in a training mode:
generating, by an antivirus (AV) engine running on a computer system, an original set of suspicious patterns that are capable of being used to detect a malware executable by scanning a first set of samples of executables known to be or contain malware;
generating, by the AV engine, a set of clean patterns by scanning a second set of samples of executables known not to be or contain malware;
creating a first revised set of suspicious patterns having a first false positive rate lower than that of the original set of suspicious patterns by removing, by the AV engine, any of the set of clean patterns from the set of suspicious patterns; and
creating and optimizing a second revised set of suspicious patterns having a second false positive rate lower than the first false positive rate by:
applying, by the AV engine, a statistical filter to the first revised set of suspicious patterns; and
removing, by the AV engine, any suspicious patterns from the first revised set of suspicious patterns that do not meet a predefined frequency of occurrence; and when in a detection mode:
receiving, by the AV engine, an executable;
extracting, by the AV engine, a set of target patterns represented within the executable;
applying, by the AV engine, a detection model, based on the second revised set of suspicious patterns, against the set of target patterns; and
flagging, by the AV engine, the executable as malware when the detection model indicates one or more target patterns within the set of target patterns matches any suspicious patterns in the second revised set of suspicious patterns.

2. The method of claim 1, further comprising when said flagging the executable as malware is determined to be a false positive, then adding the executable to the set of clean patterns and initiating retraining of the AV engine.

3. The method of claim 1, wherein said generating, by an antivirus (AV) engine running on a computer system, an original set of suspicious patterns comprises:
executing, by an emulator running on the computer system, the first set of samples of executables; and
including, by the AV engine, within the original set of suspicious patterns suspicious behaviors exhibited by the first set of samples of executables during said executing.

4. The method of claim 3, wherein said extracting, by the AV engine, a set of target patterns represented within the executable comprises causing the executable to be run within the emulator.

5. A method of creating a malware detection model, the method comprising:
generating, by an antivirus (AV) engine running on a computer system, an original set of suspicious patterns by training a machine learning module of the AV engine based on a first set of samples of executables known to be or contain malware including:
identifying similar instruction sequences within the first set of samples by scanning the first set of samples;
normalizing binary code sequences of the similar instruction sequences by removing mutable information from the binary code sequences; and
creating malware detection signatures for inclusion within the original set of suspicious patterns based on the normalized binary code sequences or hash values of the normalized binary code sequences;
generating, by the AV engine, a set of clean patterns by scanning a second set of samples of executables known not to be or contain malware;
creating a first revised set of suspicious patterns having a first false positive rate lower than that of the original set of suspicious patterns by removing, by the AV engine, those clean patterns of the set of clean patterns appearing within the set of suspicious patterns; and
creating and optimizing a second revised set of suspicious patterns having a second false positive rate lower than the first false positive rate by:
applying, by the AV engine, a statistical filter to the first revised set of suspicious patterns; and
removing, by the AV engine, those of the suspicious patterns from the first revised set of suspicious patterns that do not meet a predefined frequency of occurrence; and
creating a malware detection model for use by an AV engine of a network security device or a client device based on the second revised set of suspicious patterns.

6. The method of claim 5, wherein said generating, by an antivirus (AV) engine running on a computer system, an original set of suspicious patterns further comprises:
- executing, by an emulator running on the computer system, the first set of samples of executables; and
- including, by the AV engine, within the original set of suspicious patterns suspicious behaviors exhibited by the first set of samples of executables during said executing.

7. A method of detecting malware comprising:
- receiving, by a first antivirus (AV) engine running on a first computer system, an executable;
- extracting, by the first AV engine, a set of target patterns represented within the executable;
- applying, by the first AV engine, a malware detection model comprising a set of suspicious patterns, against the set of target patterns, wherein the malware detection model is constructed by:
  - generating, by a second antivirus (AV) engine running on a second computer system, an original set of suspicious patterns by training a machine learning module of the second AV engine based on a first set of samples of executables known to be or contain malware;
  - generating, by the second AV engine, a set of clean patterns by training a machine learning module of the second AV engine based on a second set of samples of executables known not to be or contain malware;
  - creating a first revised set of suspicious patterns having a first false positive rate lower than that of the original set of suspicious patterns by removing, by the second AV engine, those clean patterns of the set of clean patterns appearing within the set of suspicious patterns; and
  - creating and optimizing a second revised set of suspicious patterns having a second false positive rate lower than the first false positive rate by:
    - applying, by the second AV engine, a statistical filter to the first revised set of suspicious patterns; and
    - removing, by second the AV engine, those of the suspicious patterns from the first revised set of suspicious patterns that do not meet a predefined frequency of occurrence; and
  - creating the malware detection model based on the second revised set of suspicious patterns;
- identifying, by the first AV engine, the executable as malware when a match is found between a suspicious pattern of the set of suspicious patterns and a target pattern of the set of target patterns.

8. The method of claim 7, wherein said generating, by a second antivirus (AV) engine running on a second computer system, an original set of suspicious patterns by training a machine learning module of the second AV engine based on a first set of samples of executables known to be or contain malware further comprises:
- identifying similar instruction sequences within the first set of samples by scanning the first set of samples;
- normalizing binary code sequences of the similar instruction sequences by removing mutable information from the binary code sequences; and
- creating malware detection signatures for inclusion within the original set of suspicious patterns based on the normalized binary code sequences or hash values of the normalized binary code sequences.

9. The method of claim 7, wherein said generating, by a first antivirus (AV) engine running on a computer system, an original set of suspicious patterns comprises:
- executing, by an emulator running on the computer system, the first set of samples of executables; and
- including, by the AV engine, within the original set of suspicious patterns suspicious behaviors exhibited by the first set of samples of executables during said executing.

10. The method of claim 9, wherein said extracting, by the first AV engine, a set of target patterns represented within the executable comprises causing the executable to be run within the emulator.

* * * * *